United States Patent [19]
Ro et al.

[11] Patent Number: 5,940,363
[45] Date of Patent: Aug. 17, 1999

[54] OPTICAL DISK WITH A MEMORY CHIP MOUNTED THEREON

[75] Inventors: Se-Yong Ro; Sung-Hyuk Park, both of Seoul, Rep. of Korea

[73] Assignee: LG Electronics Inc., Seoul, Rep. of Korea

[21] Appl. No.: 08/852,563

[22] Filed: May 7, 1997

[30] Foreign Application Priority Data

May 7, 1996 [KR] Rep. of Korea ............... 96-14864

[51] Int. Cl.⁶ ..................... G11B 3/70; G11B 11/00
[52] U.S. Cl. ............................ 369/273; 369/13
[58] Field of Search ........................... 369/273, 290; 360/133; 340/825.54; 342/51

[56] References Cited

U.S. PATENT DOCUMENTS

| | | | |
|---|---|---|---|
| 4,338,644 | 7/1982 | Staar | 360/132 |
| 4,839,875 | 6/1989 | Kuriyama et al. | 360/132 |
| 4,868,373 | 9/1989 | Opheij et al. | 369/273 |
| 4,872,151 | 10/1989 | Smith | 369/14 |
| 5,099,226 | 3/1992 | Andrews | 340/572 |
| 5,119,353 | 6/1992 | Asakura | 369/273 |
| 5,448,110 | 9/1995 | Tuttle et al. | 340/825.54 |
| 5,493,805 | 2/1996 | Penuela et al. | 40/633 |

*Primary Examiner*—Craig A. Renner
*Assistant Examiner*—Angel Castro

[57] ABSTRACT

A memory chip mounted on an optical disk provided with a data recording region, a TOC (Table Of Content) recording region, a clamp region, and a center hole, includes an MID (Memory In Disk) chip on a portion of the optical disk for recording index data, and a plurality of input/output terminals which are in contact with the MID chip. The optical disk enables index data to be quickly and conveniently recorded and searched for in accordance with physical contact between input/output terminals provided in a recording/reading apparatus and the input/output terminals provided in the optical disk.

5 Claims, 2 Drawing Sheets

OPTICAL DISK WITH A MEMORY CHIP MOUNTED THEREON

BACKGROUND OF THE INVENTION

1. Field of the Invention

The present invention relates to an optical disk, and more particularly to a memory chip mounted on an optical disk for quickly and conveniently carrying out an index data input/output operation.

2. Description of the Prior Art

In general, an optical disk is used as a medium for recording digital data and playing back the recorded data, such as CD-I (Compact Disk Interactive media), Photo-CD (Photo Compact Disk), CD-ROM (Compact Disk Read Only Memory), DVD (Digital Video Disk) and the like.

As shown in FIG. 1, a conventional optical disk 10 includes: a data recording region 20 for recording data; a TOC (Table Of Contents) recording region 30 for recording data indexes; and a clamp region 40 provided between the TOC region 30 and a center hole 50 for clamping in a drive spindle, wherein the clamp region 40 does not have data recorded thereon.

A search process of index data recorded in the thusly constituted optical disk will now be described.

In order for a user to search for contents of index data recorded in the TOC recording region 30, because there is not provided an extra apparatus for exclusively reading the index data, the index data on the disk can be finally confirmed in accordance with a screen message displayed on a monitor after installing the optical disk in a disk player (not shown).

That is, when a disk is installed in a disk player and played back, a laser pickup for reading data recorded in the disk is moved to project a laser beam toward the TOC region 30 and to thereby and pick up reflected light serving as a data signal, for thereby decoding and displaying the data on a monitor for confirmation.

Also, when an optical disk driving apparatus (not shown) is operated for data recording, indexes are recorded on the TOC recording region 30 of a recordable optical disk.

However, in order for a user to search for contents of the index data recorded on an optical disk, the optical disk should be initially installed in a disk player, and played back, for thereby confirming the index data displayed on a monitor, so that there are required a plurality of processing steps. In addition, when more data needs to be searched, the job tends to take too much time.

SUMMARY OF THE INVENTION

Therefore, it is an object of the present invention to provide a memory chip mounted on an optical disk for quickly and conveniently carrying out an index data input/output operation by mounting an MID (Memory In Disk) chip on a portion of an optical disk which does not have data recorded thereon.

To achieve the above-described object, there is provided a memory chip mounted on an optical disk according to the present invention having a data recording region, a TOC (Table Of Content) recording region, a clamp region, and a center hole, which includes an MID (Memory In Disk) chip for recording index data on a portion of the optical disk, and a plurality of input/output terminals which are in contact with the MID chip.

Further, to achieve the above-described object, there are provided a plurality of input/output terminals which are provided to be in contact with the MID chip, and the MID chip is mounted on a region of the optical disk on which data are not recorded.

Still further, to achieve the above-described object, the input/output terminals carry out an index data input/output operation in accordance with physical contact of corresponding input/output terminals of an external recording/reading apparatus therewith.

DETAILED DESCRIPTION OF THE PRESENT INVENTION

Figure 1:
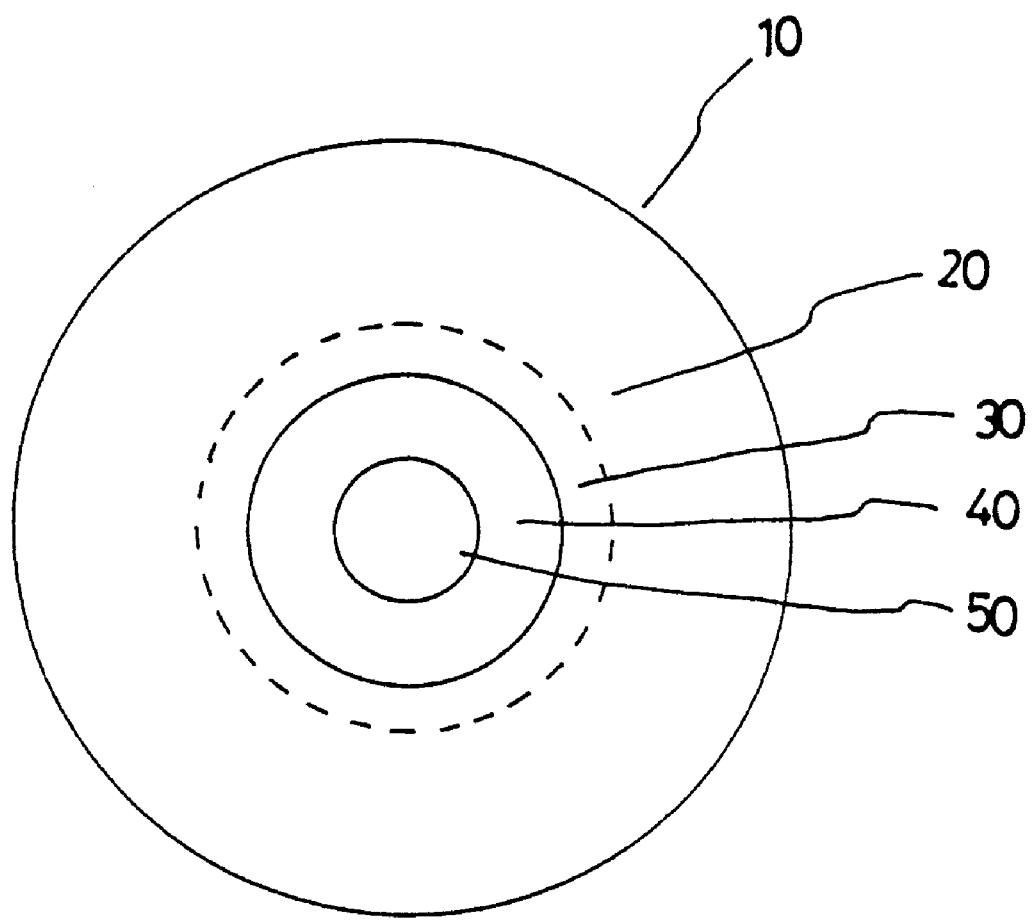
FIG. 1 is a schematic plan view of a conventional optical disk.
Figure 2A:
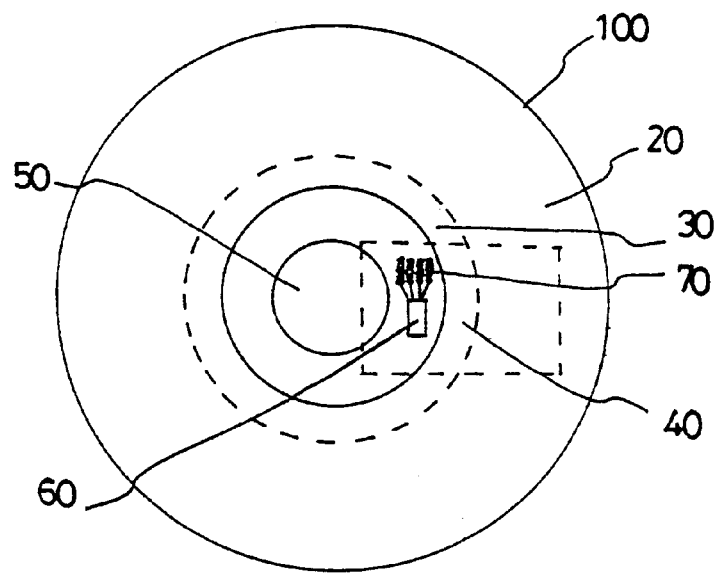
FIG. 2A is a schematic plan view of a memory chip mounted on an optical disk according to the present invention.

With reference to FIG. 2A, an optical disk 100 according to the present invention includes: a data recording region 20 for recording data; a TOC (Table Of Contents) recording region 30 for recording data indexes; a clamp region 40 provided between the TOC region 30 and a center hole 50 and with no data recorded thereon, and a memory-in-disk (MID) chip 60 for recording therein index data of data recorded in the data recording region 20.

Also, the disk 100 is used with a recording/reading apparatus (not shown) serving as an external auxiliary device for recording index data in the memory chip 60 and reading the index data recorded in the memory chip 60 in accordance with a physical contact between a plurality of input/output terminals 70 and the recording/reading apparatus (not shown).

The MID chip 60 is formed thinner than the optical disk 100, so that it is possible to insert the MID chip 60 into the optical disk 100. The MID chip 60 is mounted between the center hole 50 and the TOC recording region 30, that is to say, in the clamp region 40 on which no data is recorded or read by a laser pickup (not shown).

Four input/output terminals 70 are provided to be in contact with the MID chip 60 for thereby facilitating index data recording and reading in conjunction with the external recording/reading apparatus (not shown).

Figure 2B:
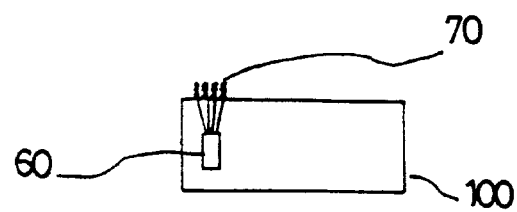
FIG. 2B is an enlarged view of input/output terminals mounted on the optical disk according to the present invention.

As shown in FIG. 2B, the input/output terminals 70 are mounted on a surface of the optical disk 100 to be thereby externally exposed, so that in accordance with a physical contact by the recording/reading apparatus (not shown) with the input/output terminals 70, required index data can be recorded in or read, from the MID chip 60. The input/output terminals 70 include terminals for a supply voltage Vcc, a ground voltage Vss, a clock input terminal CLK, and a data input/output terminal DATA.

The external recording/reading apparatus (not shown) includes corresponding input/output terminals (not shown) similarly to the optical disk 100, for thereby recording/reading index data in accordance with a physical contacting by the recording/reading apparatus (not shown) with the input/output terminals 70 of the optical disk 100.

An index data input/output process of the memory chip mounted optical disk 100 according to the present invention will now be described.

First, the clamp region 40 of the optical disk 100 is made to abut upon a spindle (not shown) of a disk player so as to spin the optical disk 100.

The clamping portion of the spindle is formed of an elastic material such as rubber to be able to install input/output terminals thereon. The thusly installed input/output terminals come into contact with the input/output terminals 70 of the optical disk 100 and are connected to a data processing device (not shown) in the recording/reading apparatus (not shown) via a shaft of the spindle.

Therefore, the recording/reading apparatus physically contacts its input/output terminals to the input/output terminals 70 of the optical disk 100, records index data, and reads the recorded index data. When data are recorded on the optical disk 100, the data which are to be recorded on the TOC recording region 30 can be simultaneously recorded in the MID chip 60.

Instead of the recording/reading apparatus (not shown) being activated according to a physical contact with the input/output terminals of the optical disk 100, an index data recording/reading apparatus using a non-contact memory IC in accordance with an RF signal can be employed.

As described above, in the memory chip mounted optical disk according to the present invention, the MID chip equipped with the input/output terminals is mounted in the optical disk, whereby required index data may be quickly and conveniently recorded and searched for in accordance with a physical contact between the input/output terminals provided in the recording/reading apparatus and the input/output provided in the optical disk.

What is claimed is:

1. A recording medium having mounted thereon a memory device, the recording medium having a data recording region, a management information region, and a region on which data are not recorded, the memory device renewing recorded information automatically by an RF signal without physical contact when information recorded on said management information region is changed.

2. The recording medium of claim 1, wherein the memory device is a memory chip.

3. The recording medium of claim 1, wherein the memory device is provided at a portion of the region on which data are not recorded.

4. The recording medium of claim 1, wherein the information about the recording medium is index data.

5. The recording medium of claim 1, wherein the information about the recording medium is information for reproducing data stored on the recording medium.

* * * * *